United States Patent
Hoard et al.

(10) Patent No.: US 8,726,638 B2
(45) Date of Patent: May 20, 2014

(54) REDUCTION OF NOX TRAP AT ENGINE SHUTOFF

(75) Inventors: John William Hoard, South Lyon, MI (US); Lifeng Xu, Farmington Hills, MI (US); Robert Walter McCabe, Novi, MI (US); Karen Marie Adams, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 120 days.

(21) Appl. No.: 13/347,073

(22) Filed: Jan. 10, 2012

(65) Prior Publication Data

US 2012/0110981 A1  May 10, 2012

Related U.S. Application Data

(63) Continuation of application No. 11/767,209, filed on Jun. 22, 2007, now Pat. No. 8,096,111.

(51) Int. Cl.
*F01N 3/00* (2006.01)
*F01N 3/02* (2006.01)

(52) U.S. Cl.
USPC .................. 60/285; 60/274; 60/295; 60/297; 60/311

(58) Field of Classification Search
USPC ............ 60/274, 285, 286, 295, 297, 301, 311
See application file for complete search history.

(56) References Cited

U.S. PATENT DOCUMENTS

| | | |
|---|---|---|
| 5,974,794 A | 11/1999 | Gotoh et al. |
| 6,220,019 B1 | 4/2001 | Sugiura et al. |
| 6,732,507 B1 | 5/2004 | Stanglmaier et al. |
| 6,796,118 B2 | 9/2004 | Kitahara |
| 6,962,045 B2 | 11/2005 | Kitahara et al. |
| 6,988,361 B2 | 1/2006 | van Nieuwstadt et al. |
| 7,040,086 B2 | 5/2006 | Kitahara et al. |
| 7,107,770 B2 | 9/2006 | Shirakawa |
| 7,571,602 B2 | 8/2009 | Koch |
| 2004/0123590 A1 | 7/2004 | Tabata et al. |
| 2005/0235634 A1 | 10/2005 | Schulte et al. |
| 2005/0241295 A1 | 11/2005 | Breuer et al. |
| 2006/0010857 A1 | 1/2006 | Hu et al. |
| 2006/0137327 A1 | 6/2006 | Shirakawa et al. |
| 2006/0168948 A1 | 8/2006 | Xu et al. |
| 2006/0168949 A1 | 8/2006 | Xu et al. |
| 2006/0179821 A1 | 8/2006 | Zhan et al. |

FOREIGN PATENT DOCUMENTS

| | | | |
|---|---|---|---|
| EP | 1637717 A1 | | 3/2006 |
| JP | 2003-239724 | * | 8/2003 |

* cited by examiner

*Primary Examiner* — Thomas Denion
*Assistant Examiner* — Diem Tran
(74) *Attorney, Agent, or Firm* — Julia Voutyras; Alleman Hall McCoy Russell & Tuttle LLP

(57) ABSTRACT

The reduction of a NOx trap upon engine shutdown is disclosed. One disclosed embodiment comprises adjusting a timing of creating a reductive environment in the exhaust conduit upstream of the lean NOx trap based upon the determined engine stop position. The creation of a reductive environment in the exhaust conduit upstream of the lean NOx trap may help to at least partially reactivate the lean NOx trap during engine shutoff.

3 Claims, 2 Drawing Sheets

REDUCTION OF NOX TRAP AT ENGINE SHUTOFF

CROSS REFERENCE TO RELATED APPLICATIONS

The present application is a continuation of U.S. patent application Ser. No. 11/767,209 filed Jun. 22, 2007, the entire contents of which are incorporated herein by reference for all purposes.

FIELD

This disclosure relates to an emission control system of an internal combustion engine system, and in particular to the reduction of a lean NOx trap at engine shutoff.

BACKGROUND AND SUMMARY

Engine emissions control systems may use a lean NOx trap to reduce nitrogen oxide ("NOx") emissions. Generally, a lean NOx trap is a device that stores NOx compounds present in lean exhaust (i.e. exhaust that has an excess of oxidants relative to reductants). Periodically, rich exhaust may be provided to the lean NOx trap to reduce NOx compounds stored in the lean NOx trap, thereby regenerating the trap. Lean NOx traps may also variously be referred to as NOx storage-reduction catalysts, or simply NOx catalysts.

Engine emissions control systems also may use a diesel particulate filter (DPF) or a catalyzed diesel particulate filter (CDPF) to reduce particulate emissions. Such filters may be periodically regenerated when the particulate matter builds up to levels where pressure drop across the filter exceeds a specified level. Active regeneration of a loaded DPF or CDPF can take several tens of minutes and may require that lean exhaust having a considerable excess of oxygen (over reductants) be supplied to the DPF or CDPF for the duration of the regeneration process to ensure sufficient oxygen to sustain combustion of the particulate matter. However, catalyst deactivation of the lean NOx trap may occur during the higher temperature lean operation of DPF or CDPF regeneration. Where engine shutoff occurs during DPF/CDPF regeneration or during other periods of lean operation, a lean NOx trap may be left in the deactivated state.

In one approach, the above issues may be at least partially addressed in an apparatus having an engine, an exhaust conduit and a lean NOx trap disposed along the exhaust conduit by detecting an engine shutoff, determining an engine stop position, and creating a reductive environment in the exhaust conduit upstream of the NOx trap at a time based upon the engine stop position. This may create a reductive environment in the NOx trap during engine shutoff, and therefore may help to at least partially reactivate the lean NOx trap during engine shutoff.

DETAILED DESCRIPTION OF THE DEPICTED EMBODIMENTS

As described in further detail herein, there may be various issues related to lean NOx trap performance encountered when an engine is shutoff during lean operation. One strategy to address at least some of these issues creates a rich exhaust gas environment in a lean NOx trap during engine shutoff to thereby expose the lean NOx trap to a reducing environment during engine shutoff. Such operation may enable the restoration of catalytic materials in the lean NOx trap (for example, rhodium (Rh)) to a reduced state with enhanced NOx control capability, and thereby provide for better lean NOx trap performance on engine startup. This approach is generally in contrast to previous approaches in which engine shutoff during lean operation may leave a lean NOx trap in a lean exhaust environment after shutoff, which thereby may leave the lean NOx trap in a deactivated state for engine startup.

Figure 1:
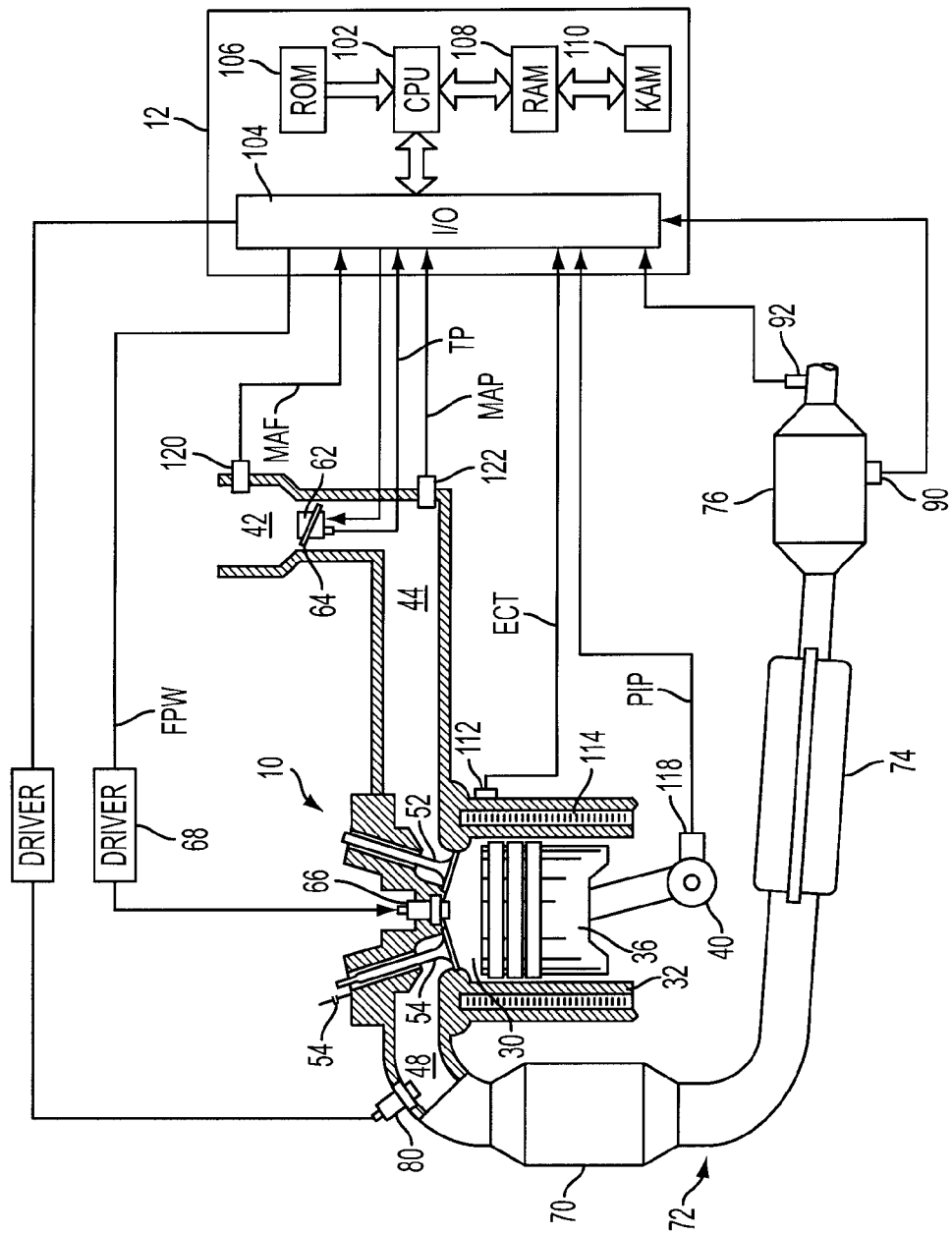
FIG. 1 shows an embodiment of an engine system.

Various examples of the approaches described herein may be understood with respect to an example engine and exhaust system, such as that described in FIG. 1. Specifically, FIG. 1 shows an example internal combustion engine 10 comprising a plurality of combustion chambers, only one of which is shown. The engine 10 may be controlled by electronic engine controller 12. In one example, engine 10 may be a common rail direct injection diesel engine.

Combustion chamber 30 of engine 10 comprises combustion chamber walls 32 with piston 36 positioned therein and connected to crankshaft 40. Combustion chamber 30 is shown communicating with intake manifold 44 and exhaust manifold 48 via intake valve 52, and exhaust valve 54. While this example shows a single intake and exhaust valve, one or more cylinders may include a plurality of intake and/or exhaust valves.

Fuel injector 66 is shown directly coupled to combustion chamber 30 for delivering liquid fuel directly therein in proportion to the pulse width of signal fpw received from controller 12 via electronic driver 68. Fuel may be delivered by a fuel system (not shown) including a fuel tank, fuel pumps, and a common fuel rail (not shown). In some embodiments, engine 10 may include a plurality of combustion chambers each having a plurality of intake and/or exhaust valves.

Intake manifold 44 may include a throttle body 42 and a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake manifold 42 may also include a mass air flow sensor 120 and a manifold air pressure sensor 122 for providing respective signals MAF and MAP to controller 12.

A lean NOx trap 70 is shown along an exhaust conduit 72 in communication with exhaust manifold 48. A second catalytic device, for example, a selective catalytic reduction (SCR) system 74, is positioned along exhaust conduit 72 downstream of lean NOx trap 70. SCR system 74 may be a hydrocarbon SCR system, a urea SCR system, or any other suitable type of SCR system. Various components commonly found in SCR systems, such as a reductant tank and reductant injector, are omitted from FIG. 1 for clarity. A third catalytic device, for example, a diesel particulate filter (DPF) or catalyzed diesel particulate filter (CDPF) 76, is shown downstream of lean NOx trap 70 and SCR system 74. It will be appreciated that the term "diesel particulate filter" and abbreviation "DPF" may be used herein to signify either a diesel particulate filter or a catalyzed diesel particulate filter.

In one embodiment, lean NOx trap 70 may be configured to have NOx trapping capabilities at low temperatures, for example, on the order of 150 degrees Celsius, or even lower. Such a lean NOx trap may be used to adsorb NOx during engine cold start, thereby lowering NOx emissions during engine startup. Such a lean NOx trap may also purge NOx gases at temperatures of approximately 350 degrees Celsius. In the event that NOx slippage occurs at high operating speeds or during acceleration (which may cause lean NOx trap 70 to reach these temperatures), SCR system 74 may be used to convert the slipped NOx. Such a lean NOx trap may also be an effective HC/CO oxidation catalyst, and therefore further suitable for use as the first catalyst in the exhaust stream. One specific example of such a NOx trap comprises a cordierite monolith substrate washcoated with an alumina layer impregnated with NOx storage materials (Ce, Ba, K or the like) and PGM (Pt, Pd, and/or Rh). In an alternative embodiment, lean NOx trap 70 is configured to trap NOx at higher operating temperatures.

While lean NOx trap 70 is depicted as being close-coupled relative to cylinder 30 and positioned upstream of SCR system 74 and DPF 76, it will be appreciated that lean NOx trap 70 may be disposed at other suitable locations along exhaust conduit 72, and may be positioned either before or after other catalytic devices. Further, lean NOx trap 70, SCR system 74, DPF 76, and/or combinations thereof, may be combined into one converter assembly if desired. Engine 10 may also include any other suitable emissions devices other than those depicted, including but not limited to a diesel oxidation catalyst.

To provide more accurate control of engine operation and/or exhaust air-fuel ratio, one or more exhaust sensors may be used in the exhaust system, such as various NOx sensors, ammonia sensors, etc. Two example sensors are shown at 90 and 92.

A reductant injector 80, such as a fuel injector, may be located in the engine exhaust for providing a reductant to the exhaust to increase the richness of the exhaust. Reductant injector 80 may be activated by controller 12 as described above for fuel injector 66. Further, the system may include a reformer (not shown) to process fuel into $H_2$, CO, cracked and partially oxidized hydrocarbons for injection into the exhaust, thereby enabling improved reduction performance. Still other methods of reductant delivery to the exhaust, such as rich combustion, may also be used.

Controller 12 is shown in FIG. 1 as a microcomputer including: microprocessor unit 102, input/output ports 104, an electronic storage medium of executing programs and calibration values, shown as read-only memory (ROM) chip 106 in this particular example, random access memory (RAM) 108, keep alive memory (KAM) 110, and a data bus (I/O). Controller 12 may include code stored on computer readable medium that can be executed by the controller. Controller 12 is also shown receiving various signals from sensors coupled to engine 10, in addition to those signals previously discussed, including: engine coolant temperature (ECT) from temperature sensor 112 coupled to cooling sleeve 114; a profile ignition pickup signal (PIP) from Hall effect sensor 118 coupled to crankshaft 40 giving an indication of engine speed (RPM); throttle position TP from throttle position sensor 120; and absolute Manifold Pressure Signal MAP from sensor 122.

Combustion in engine 10 can be of various types, depending on operating conditions. While FIG. 1 depicts a compression ignition engine, it will be appreciated that the embodiments described herein may be used in any suitable engine, including but not limited to, diesel and gasoline compression ignition engines, spark ignition engines, direct or port injection engines, etc. Further, various fuels and/or fuel mixtures such as diesel, bio-diesel, etc, may be used.

In embodiments where lean NOx trap 70 is configured to have NOx trapping capabilities at low temperatures (i.e. around 150 degrees Celsius, or even lower), lean NOx trap 70 may not trap NOx with a desired efficiency during cold startup if lean NOx trap 70 is in a deactivated condition when the engine is shut off. Lean NOx trap 70 may be in a deactivated condition at engine shutoff under various operating conditions. For example, lean NOx trap 70 may be in a relatively deactivated condition at engine shutoff if the engine is shutoff during ordinary lean operation Likewise, lean NOx trap 70 may be in a deactivated condition at engine shutoff if the engine is shutoff during DPF regeneration, which may involve elevating exhaust temperatures and providing an oxidizing environment to the DPF to oxidize trapped particulate matter.

Figure 2:
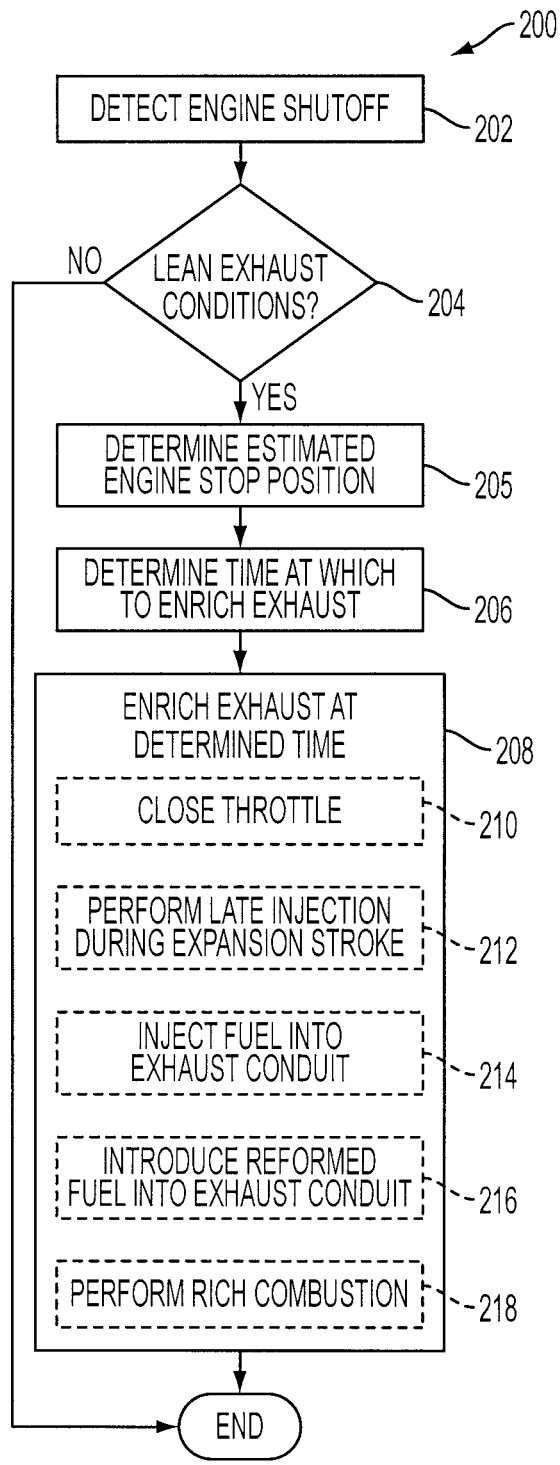
FIG. 2 shows a flow chart depicting an embodiment of a method for creating an reductive environment in a NOx trap at engine shutoff.

Therefore, to help assure effective performance of lean NOx trap 70 for NOx adsorption on cold start, a strategy to reduce lean NOx trap upon engine shutoff may be employed. FIG. 2 shows a flow diagram of one embodiment of a method 200 for reducing a lean NOx trap upon engine shutoff. Method 200 first comprises, at 202, detecting an engine shutoff. Upon detecting the engine shutoff, method 200 next comprises, at 204, determining whether the engine shutoff occurred during lean exhaust conditions that may result in NOx trap deactivation.

If it is determined at 204 that the engine shutoff occurred during conditions not likely to result in NOx trap deactivation, method 200 ends. On the other hand, if it is determined at 204 that engine shutoff occurred during conditions likely to result in NOx trap deactivation, then method 200 comprises, at 205, estimating an engine stop position; at 206, determining a time at which to enrich the engine exhaust; and, at 207, enriching the engine exhaust at the determined time. Each of these steps is described in more detail below.

First, the engine stop position may be estimated in any suitable manner. For example, some engines are configured upon shutoff to cut fuel to the engine and to allow the engine to rotate to a stop, which may take several revolutions. Other engines may employ other shutdown strategies, including but not limited to various valve timing and combustion strategies, to modify various engine operation characteristics during shutoff. However, with any shutdown strategy, an engine stop position may be determined or estimated based upon the engine operating conditions existing at the time of shutdown and upon the specific shutdown strategy employed. For example, information relating specific engine stop positions with various engine operating conditions (e.g. engine speed at time of shutdown, etc.) may be mapped in a look-up table stored on controller 12. Alternatively, the stop position may be estimated in real time by monitoring the engine during shutdown, may be calculated utilizing a function that relates various engine operating variables to a stop location, and/or in any other suitable manner.

After determining an estimated engine stop position, method 200 next comprises, at 206, determining a time or engine position at which to enrich the exhaust based upon the engine stop position. The exhaust may be enriched at any suitable engine time or engine position relative to the stop position. Suitable times or engine positions at which to enrich the exhaust include engine times or positions that create a rich environment within the lean NOx trap during engine shutoff, thereby helping to reduce the lean NOx trap before the next engine start. The time may be a predetermined set time used for each shutoff, or may be varied depending upon engine conditions prior to and/or during shutoff. Furthermore, where the rich environment is created by the late injection of fuel into one or more cylinders, the time may vary depending upon the cylinder into which fuel is injected.

Next, method 200 comprises, at 208, enriching the exhaust at the determined time. The exhaust may be enriched in any suitable manner. For example, the exhaust may be enriched by closing a throttle, as indicated at 210, to reduce engine airflow. This may also offer the advantage of reducing engine shake during shutdown. Alternatively or additionally, the exhaust may be enriched by injecting fuel into one or more cylinders late in the expansion stroke, as indicated at 212. This injection may be timed such that the late-injected fuel does not burn and release work that would prevent the engine from stopping. In yet another approach, the exhaust may be enriched by injecting fuel directly into the exhaust via reductant injector 80, as indicated at 214, either alone or in combination with other approaches. Further, the exhaust may be enriched by injecting reformed fuel from a reformer into the exhaust and/or into the cylinder at an appropriate timing, as indicated at 216. Reformed fuel may comprise reductants such as $H_2$, CO, and cracked and partially oxidized hydrocarbons, which may offer improved reduction performance over the use of unreformed fuel as a reductant. In yet another approach, the exhaust may be enriched by performing one or more rich combustions in engine 10.

The exhaust may be enriched to any suitable air/fuel ratio. Suitable ratios include air/fuel ratios of stoichiometry or richer. Further, the size of the enrichment (as measured by mass, volume, time, or any other suitable unit) may have any suitable value. Suitable enrichments include enrichments suitable to make the exhaust left in the lean NOx trap during shutoff rich, yet to avoid the escape of hydrocarbons, carbon monoxide, and other such emissions from the downstream catalyst(s) so as to avoid direct exhaust emissions or potential evaporative emissions during diurnal soak. Suitable enrichments may be achieved, for example, via the late expansion stroke injection of fuel into only a few cylinders for a very short time. The fuel cost of such a strategy may be quite small, as only a small volume of exhaust is enriched.

It is noted that, in the case of a close-coupled low-temperature lean NOx trap, such lean NOx traps may be quickly and easily desulfated around 500 degrees Celsius and air/fuel ratios of stoichiometry or richer. Therefore, should the driver stop the engine immediately following high speed operation (for example, to fill the fuel tank at a highway rest stop), the lean NOx trap may be hot enough to desulfate in a reducing atmosphere, thereby providing an additional advantage of method 200.

While method 200 as depicted shows that the exhaust is enriched only if the engine shutoff occurred during conditions that may cause deactivation of a lean NOx trap (such as during DPF regeneration, after periods of lean operation, etc.), in other embodiments, the exhaust may be enriched upon detecting any engine shutoff. Further, it will be appreciated that the configurations and routines disclosed herein are exemplary in nature, and that these specific embodiments are not to be considered in a limiting sense, because numerous variations are possible. For example, the methods described herein may be used with any suitable combination of a lean NOx trap with other catalytic devices, and with any suitable type of engine. The subject matter of the present disclosure includes all novel and nonobvious combinations and subcombinations of the various systems and configurations, and other features, functions, and/or properties disclosed herein. Further, while various theories may have been set forth herein (such as regarding the theory that high temperature exposure to lean exhaust gas air-fuel ratio conditions may deactivate a lean NOx trap), the approaches and systems set forth herein do not necessarily rely on the correctness of such theories.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a diesel engine having a diesel particulate filter (DPF) and a lean NOx trap (LNT) in an exhaust, comprising:
   regenerating the DPF at elevated temperatures with a lean exhaust;
   detecting an engine shutoff during DPF regeneration;
   creating a rich environment within the LNT at shutoff by closing an intake throttle based on whether the engine is stopped immediately following high speed operation where the lean NOx trap is hot enough to desulfate in a reducing atmosphere; and
   adjusting the rich environment creation based upon a condition.

2. A method for a diesel engine having a diesel particulate filter (DPF) and a lean NOx trap (LNT) in an exhaust, comprising:
   regenerating the DPF at elevated temperatures with a lean exhaust;
   detecting an engine shutoff during DPF regeneration;
   creating a rich environment within the LNT at shutoff by closing an intake throttle based on whether the engine is stopped immediately following high speed operation; and
   adjusting the rich environment creation based upon a condition.

3. A method for a diesel engine having a diesel particulate filter (DPF) and a lean NOx trap (LNT) in an exhaust, comprising:
   regenerating the DPF at elevated temperatures with a lean exhaust;
   detecting an engine shutoff during DPF regeneration;
   creating a rich environment within the LNT at shutoff by closing an intake throttle based on whether the engine is stopped with NOx trap temperature higher than a rich desulaftion temperature; and
   adjusting the rich environment creation based upon a condition.

* * * * *